United States Patent
Yamada

(10) Patent No.: US 7,324,997 B2
(45) Date of Patent: Jan. 29, 2008

(54) BOOKMARK MANAGING SYSTEM AND BOOKMARK MANAGING METHOD

(75) Inventor: Hiroshi Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 343 days.

(21) Appl. No.: 10/224,372

(22) Filed: Aug. 21, 2002

(65) Prior Publication Data

US 2003/0046290 A1    Mar. 6, 2003

(30) Foreign Application Priority Data

Aug. 29, 2001    (JP)    ............................. 2001-260495

(51) Int. Cl.
   G06F 17/30    (2006.01)
   G06F 15/16    (2006.01)
(52) U.S. Cl. ................. 707/10; 707/1; 707/3; 709/219
(58) Field of Classification Search ............ 707/1, 707/3, 10; 709/219; 455/414.1
   See application file for complete search history.

(56) References Cited

U.S. PATENT DOCUMENTS

| 6,493,702 | B1* | 12/2002 | Adar et al. ................. 707/3 |
| 2002/0026500 | A1* | 2/2002 | Kanefsky et al. ........... 709/219 |
| 2002/0083035 | A1* | 6/2002 | Pearl et al. ................. 707/1 |
| 2002/0163532 | A1* | 11/2002 | Thomas et al. ............. 345/723 |
| 2002/0165767 | A1* | 11/2002 | Ogura et al. ................ 705/14 |
| 2003/0188263 | A1* | 10/2003 | Bates et al. ................. 715/513 |
| 2004/0048603 | A1* | 3/2004 | Corneliussen et al. ... 455/414.1 |

FOREIGN PATENT DOCUMENTS

| EP | 1 030 247 A2 | 8/2000 |
| GB | 2 356 072 A | 5/2001 |
| WO | 99/35777 | 7/1999 |
| WO | 00/67159 | 11/2000 |
| WO | 01/55909 A1 | 8/2001 |

* cited by examiner

Primary Examiner—Tony Mahmoudi
(74) Attorney, Agent, or Firm—Young & Thompson

(57) ABSTRACT

A bookmark managing system is provided which is capable of effectively managing a bookmark function even when a user is using a plurality of terminals. The bookmark managing system includes terminals to be used by the user, information providing server which provides contents to the terminals, an Internet to connect the terminals to the information providing server, and browsers used to browse contents incorporated in the terminals. It is also provided with a bookmark managing server being connected to the Internet and having a bookmark information list providing shared bookmark information which can perform a bookmark function even when the user is using a plurality of types of the terminals. The bookmark information has, at least, name information providing contents to be linked to and one and more URL information corresponding to the name information.

10 Claims, 7 Drawing Sheets

| category | name | URL1 | URL2 | comment |
|---|---|---|---|---|
| information industry | NetBank | ... | ... | bank in "IT" age |
| information industry | Secure info | ... | ... | security caution information |
| finance and investment | NASDOG Watch | ... | ... | today's movement |
| finance and investment | NetBank | ... | ... | bank in "IT" age |
| finance and investment | NetSeimei | ... | ... | insurance in "IT" age |

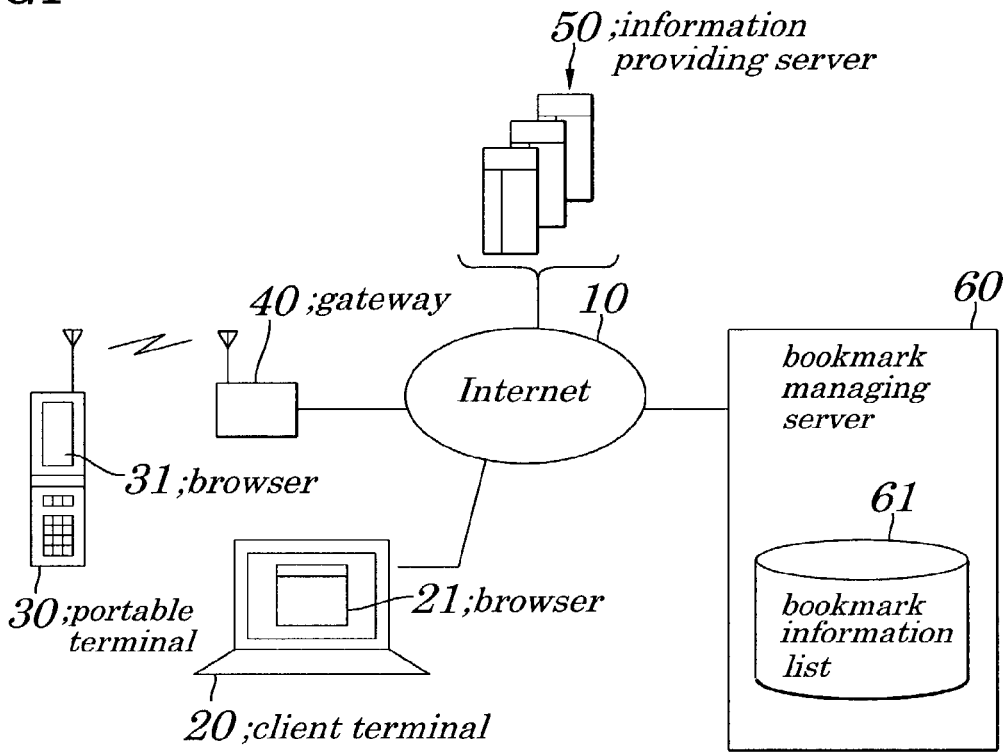

| | | |
|---|---|---|
| IT | | |
| | *NEC* | recommended |
| | *Biglobe* | my favorite |
| Finance | | |
| | ○○*bank* | GOOD! |
| | *Dahoo!* | information collection |
| | *Sintaku* | most suitable for investment |
| 611 | 612 | 613 |

FIG5

| renewing of bookmark | | | | | | |
|---|---|---|---|---|---|---| name of type: | IT ▼ | present bookmark

| name | URL1 | URL2 | comment | disclosure | order | deletion |
|---|---|---|---|---|---|---|
| NEC | www.nec.co.jp/ | www.nec.co.jp/i/ | recommended | ○ | ▲▼ | ■ |
| Biglobe | www.biglobe.ne.jp/ | www.biglobe.ne.jp/i-mode/ | my favorite | ○ | ▲▼ | ☐ | addition of bookmark

| name | |
|---|---|
| URL1 | |
| URL2 | |
| comment | |
| disclosure | |

| transmittance | cancellation |

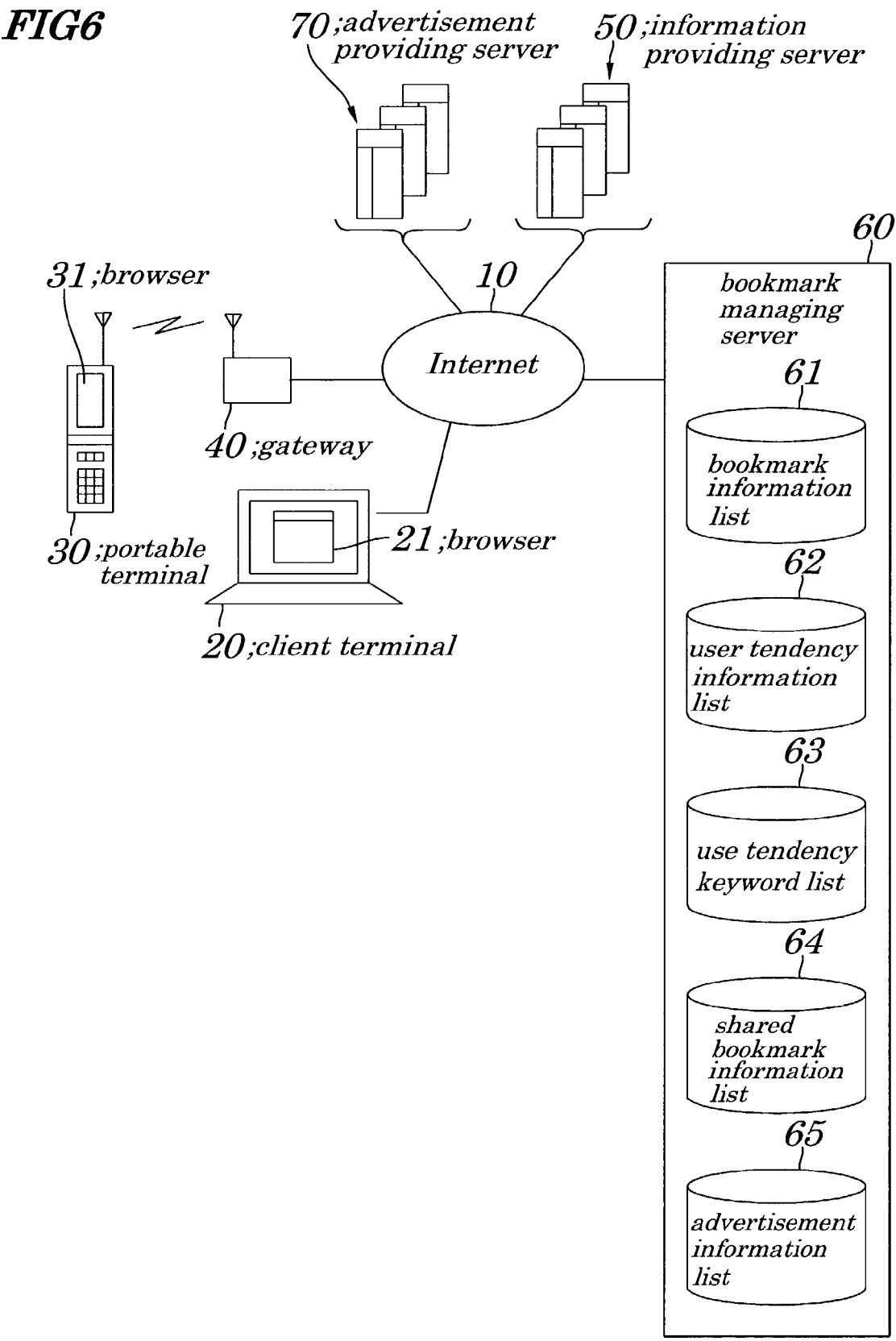

*FIG7*

| category | number of contents registered | number of contents referred to |
|---|---|---|
| information industry | 2 | 654 |
| finance and investment | 3 | 413 |
| automobiles | ... | ... |
| music | ... | ... |

*FIG8*

| category | keyword |
|---|---|
| information industry | www.nec.co.jp |
| information industry | N E C |
| information industry | nippon denki |
| information industry | www.biglobe.ne.jp |
| information industry | BIGURO-BU |
| finance and investment | www.oobank.co.jp |
| finance and investment | ○○bank |
| finance and investment | www.dahoo.co.jp/finance/ |
| finance and investment | www.kabu.com/ |
| finance and investment | stock.com |

*FIG9*

| category | name | URL1 | URL2 | comment |
|---|---|---|---|---|
| information industry | NetBank | ... | ... | bank in "IT" age |
| information industry | Secure info | ... | ... | security caution information |
| finance and investment | NASDOG Watch | ... | ... | today's movement |
| finance and investment | NetBank | ... | ... | bank in "IT" age |
| finance and investment | NetSeimei | ... | ... | insurance in"IT" age |

*FIG10*

| category | advertisement content | URL1 | URL2 | advertisement letters |
|---|---|---|---|---|
| information industry | nippon denki | ... | ... | ... |
| information industry | internet information bureau | ... | ... | ... |
| finance and investment | gondo commercial company | ... | ... | ... |
| finance and investment | ○○bank | ... | ... | ... |
| finance and investment | daily investment information | ... | ... | ... |

FIG11

| | | | |
|---|---|---|---|
| IT | NEC | recommended | gondo commercial company |
| | Biglobe | my favorite | we are entirely at your service for investment and stock transaction |
| Finance | ○○bank | GOOD | |
| | Dahoo! | information collection | Tel: |
| | Sintaku | most suitable for investment | 0120-123-4567 |
| recommendation | NetBank | bank in "IT" age | |
| | NASDOG watch | today's movement | |

FIG12

| |
|---|
| ① advertisement:gondo commercialcompany |
| IT |
| ②NEC |
| ②Biglobe |
| Finance |
| ③○○bank |
| ④ Dahoo! |
| ⑤Sintaku |
| recommendation |
| ⑥ NetBank |
| ⑦ NASDOG watch | bookmark information

| name | URL |
|---|---|
| NEC | www.nec.co.jp/ |
| Biglobe | www.biglobe.ne.jp/ |
| ○○bank | www.oobank.co.jp/ |
| Dahoo! | www.dahoo.co.jp/finance/ |
| Sintaku | www.kabu,com/login.cgi=3489 |

BOOKMARK MANAGING SYSTEM AND BOOKMARK MANAGING METHOD

BACKGROUND OF THE INVENTION

1. Field of the Invention

The present invention relates to a bookmark managing system and a bookmark managing method and more particularly to the bookmark managing system and the bookmark managing method employed when a user is using a plurality of terminals.

The present application claims priority of Japanese Patent Application No. 2001-260495 filed on Aug. 29, 2001, which is hereby incorporated by reference.

2. Description of the Related Art

A bookmark of this type represents a function of storing a URL (Uniform Resource Locator) that has been incorporated in a WWW (World Wide Web) browser, that is, the function that enables a user to pull down and select a Web page that the user finds and wants to frequently confirm and recognize, from a menu, by registering a desired URL, when the user wishes to again access to the Web page next time, without re-inputting of the URL. Therefore, the user, when wishing to access to a content, if the URL of the content is one that-has been registered on the bookmark, can save work of again inputting the URL and can easily make an access to the contents being frequently used.

A conventional bookmark managing system will be described by referring to FIGS. 13 and 14. FIG. 13 is a diagram showing configurations of the conventional bookmark managing system. FIG. 14 is a diagram showing an example of bookmark information in the conventional bookmark managing system.

The conventional bookmark managing system, as shown in FIG. 13, includes a client terminal 20 or a portable terminal 30 being used by the user, an information providing server 50 to provide information to the user, and the Internet 10 to connect the client terminal 20 and portable terminal 30 to the information providing server 50.

Next, configurations of each component of the conventional bookmark managing system will be described. The client terminal 20 is a terminal of a personal computer or a like which is provided internally with a browser 21 having a function of displaying WWW contents or a like and which is connected to the Internet 10. When the user inputs an address such as the URL or a like from the client terminal 20, the browser 21 obtains desired WWW contents and displays them.

The portable terminal 30 includes a portable cellular phone or a like and is provided internally with a browser 31 having a function of displaying WWW contents or the like and is connected through a gateway 40 to the Internet 10. When the user inputs an address such as the URL or a like through the portable terminal 30, the browser 31 obtains desired WWW contents from the information providing server 50 through the Internet 10 and displays them in the same way as done by the browser 21.

The conventional client terminal 20 and portable terminal 30 have a bookmark function adapted to manage such bookmark information as shown in FIG. 14. That is, bookmark information is stored in a manner that each "name" corresponds to each URL. The URL is a displaying method for indicating a place of an object on the Internet.

For example, the client terminal 20 or portable terminal 30 stores "URLS" such as "www. nec. co. jp/", "www. biglobe. ne. jp/", "www. oobank. co. jp/" (or a like) corresponding respectively to "NEC", "Biglobe", "OO bank".

Therefore, the user, when accessing to contents, can save work of doubly inputting the URL by using such the bookmark function.

However, the conventional bookmark function has a problem in that, if one user is using a plurality of terminals and when a bookmark is made same among two or more terminals, bookmark information stored in each terminal has to be changed individually and synchronization for the bookmark among terminals is not easy.

Moreover, when WWW contents using a browser installed in a portable terminal such as a portable cellular phone or a like are referred to by the user, the portable terminal, due to its processing and/or displaying capability constraint, has no other choice but to use a URL being different from that indicating WWW contents that can be displayed by the browser installed 21 in an ordinary personal computer in many cases. In this case, if the conventional bookmark function is used, only one URL can be stored to register the URL indicating one content. Therefore, there is a problem in that, since bookmark information cannot be commonly possessed among terminals, when bookmark information for desired contents are registered, a plurality of pieces of the bookmark information to be used for personal computers, portable terminals or a like has to be registered, thus causing difficult and complicated work.

Also, when the conventional bookmark function is used, the bookmark information being individually possessed by the user is limited to individual use and, as a result, when the bookmark information is transferred to others, another means such as oral or mail transferring method, or a like has to be employed among individuals.

Furthermore, in recent years, though distribution of advertisement contents using the Internet is becoming widespread, when the conventional bookmark function is employed, the advertisement contents in which the user does not show an interest in are also distributed at a same time, which makes it difficult to achieve effective distribution of contents.

SUMMARY OF THE INVENTION

In view of the above, it is an object of the present invention to provide a bookmark managing system that enables same bookmark information to be registered on a plurality of terminals.

According to a first aspect of the present invention, there is provided a bookmark managing system for managing a bookmark function including:

a terminal to be used by a user;

an information providing server that provides contents to the terminal;

an Internet used to connect the terminal to the information providing server;

a browser incorporated in the terminal and used to browse the contents;

wherein bookmark information containing an address required for the user to access to desired contents is stored in advance and an address of desired contents is easily acquired from the bookmark information when the user needs the address, and;

wherein a bookmark managing server is provided which is connected to the Internet and has a bookmark information list obtained by collecting the bookmark information of the terminal and wherein the bookmark function is able to be used when the user uses the terminal.

In the foregoing, a preferable mode is one wherein the bookmark information list is made up of shared bookmark information obtained by collecting the bookmark information for each type of terminal and is constructed so that, the user, when using the terminal of a plurality of terminals, is able to employ the bookmark function depending on a type of the terminal to be used the user.

Also, a preferable mode is one wherein the address is expressed by a URL (Uniform Resource Locator).

Also, a preferable mode is one wherein the bookmark information is made up of at least name information indicating contents to be linked to and one and more pieces of URL information corresponding to the name information.

Also, a preferable mode is one wherein the bookmark information in the bookmark information list further contains type information used to identify contents to be linked to.

Also, a preferable mode is one wherein the bookmark information contains information about comments on the contents to be linked to.

Also, a preferable mode is one wherein the bookmark information further contains information about disclosure indicating whether the bookmark information is allowed to be made open to a third party.

Also, a preferable mode is one wherein one and more pieces of URL information is made up of first URL information provided by a browser of a client terminal being used by the user and of second URL information provided by a browser of a portable terminal being used by the user.

Also, a preferable mode is one wherein the first URL information is written in HTML (Hyper Text Markup Language) and the second URL information is written in Compact HTML or WML (Wireless Markup Language).

Also, a preferable mode is one wherein the bookmark managing server has a function of editing the bookmark information.

Also, a preferable mode is one wherein the function of editing the bookmark information includes a function of adding, deleting, or changing the bookmark information, or changing an order in which the bookmark information is displayed.

Also, a preferable mode is one wherein the bookmark managing server has a function of identifying a type of the terminal and of selecting, based on a result of the identification, one piece of the URL information from one and more pieces of the URL information being contained in the bookmark information.

Also, a preferable mode is one wherein the bookmark managing server has a function of obtaining information about use tendency of the user indicating what kind of a type of the content is registered by the user as the bookmark information and to what extent the user makes an access to the content.

Also, a preferable mode is one wherein the bookmark managing server has a function of obtaining information about a shared bookmark, from the information about use tendency of the user, indicating what kind of the information the user has an interest in or what kind of the information the user needs.

Also, a preferable mode is one wherein the bookmark managing server has a function of selecting bookmark information from the shared bookmark information by using the information about use tendency of the user and of distributing the selected bookmark information to the terminal.

Furthermore, a preferable mode is one wherein the bookmark managing server selects information about a content of an advertisement that is able to correspond to information about use tendency of a user and distributes the selected information to the terminal.

According to a second aspect of the present invention, there is provided a bookmark managing method for managing a bookmark function of storing in advance bookmark information containing an address used for a user to access to desired contents and of easily obtaining the address of the desired contents from the bookmark information whenever the user needs in a network of an Internet including a terminal to be used by the user, an information providing server to provide contents to the terminal, the Internet to connect the terminal to the information providing server, and a browser to browse the contents stored in the terminal, the bookmark managing method including:

a step of constructing the network of the Internet in which a bookmark managing server having a bookmark information list made up of shared bookmark information obtained by collecting bookmark information for each type of the terminal is provided.

In the foregoing, a preferable mode is one wherein the bookmark information list is made up of shared bookmark information obtained by collecting bookmark information by the type of the terminal which is able to use the bookmark function whenever the user uses the terminal.

Also, a preferable mode is one wherein the address is expressed by a URL (Uniform Resource Locator).

Also, a preferable mode is one wherein the bookmark information contains, at least, name information indicating contents to be linked to and one and more pieces of URL information corresponding to the name information.

Also, a preferable mode is one wherein the bookmark information in the bookmark information list further contains type information used to identify a type of the contents to be linked to.

Also, a preferable mode is one wherein the bookmark information further contains information about comments on the contents to be linked to.

Also, a preferable mode is one wherein the bookmark information further contains information about disclosure indicating whether the bookmark information is allowed to be made open to a third party.

Also, a preferable mode is one wherein each of the one and more pieces of the URL information is made up of a first URL information provided by a browser of a client terminal to be used by the user and a second URL information provided by a browser of a portable terminal to be used by the user.

Also, a preferable mode is one wherein the first URL information is written in HTML (Hyper Text Markup Language) and the second URL information is written in Compact HTML or WML (Wireless Markup Language).

Also, a preferable mode is one wherein the bookmark managing server is able to edit the bookmark information.

Also, a preferable mode is one wherein the edition includes addition, deletion, or change of the bookmark information, or change of an order in which the bookmark information is displayed.

Also, a preferable mode is one wherein the bookmark managing server is able to identify a type of the terminal and to select, based on a result of the identification, one piece of the URL information from one and more pieces of the URL information being contained in the bookmark information.

Also, a preferable mode is one wherein the bookmark managing server is able to obtain information about use tendency of the user indicating what kind of a type of a content is registered by the user as the bookmark information and to what extent the user makes an access to the content.

Also, a preferable mode is one wherein the bookmark managing server is able to obtain information about a shared bookmark, from the information about the use tendency of the user, indicating what kind of the information the user has an interest in or what kind of information the user needs.

Also, a preferable mode is one wherein the bookmark managing server is able to select bookmark information from the shared bookmark information by using the information about the use tendency of the user and is able to distribute the selected bookmark information to the terminal.

Furthermore, a preferable mode is one wherein the bookmark managing server is able to select information about contents of an advertisement that corresponds to the information about the use tendency of the user and is able to distribute the selected information to the terminal.

With the above configuration, since the bookmark information is managed not on a side of a terminal but on a side of the bookmark managing server, the bookmark information can be shared while one user is using a plurality of terminals.

Also, since, in the bookmark information managed by the bookmark managing server are stored one and more URLs for one bookmark and, when the bookmark information is transmitted by the bookmark managing server, a URL is selected by a type of a terminal, the bookmark information can be simply shared even when the user is using a plurality of types of terminals.

Moreover, since the bookmark managing server obtains information about the use tendency of the user from the bookmark information having been registered by the user, it can suitably distribute, to the user, bookmark information that can match the interests or the liking of the user.

Furthermore, since the bookmark managing server obtains information about the use tendency of the user from the bookmark information having been registered by the user, it can suitably distribute, to the user, the advertisement that can match the interests or liking of the user.

BRIEF DESCRIPTION OF THE DRAWINGS

The above and other objects, advantages, and features of the present invention will be more apparent from the following description taken in conjunction with the accompanying drawings in which:

FIG. 1 is a schematic block diagram showing configurations of a bookmark managing system according to a first embodiment of the present invention;

FIG. 2 is a diagram showing an example of a display of a bookmark performed by a browser function provided by a personal computer in the bookmark managing system according to the first embodiment of the present invention;

FIG. 5 is a diagram showing a screen for renewing the bookmark information list employed in the bookmark managing system according to the first embodiment of the present invention;

FIG. 6 is a schematic block diagram showing configurations of a bookmark managing system according to a second embodiment of the present invention;

FIG. 7 is a list showing a use tendency information list in the bookmark managing system according to the second embodiment of the present invention;

FIG. 8 is a diagram showing an example of another use tendency information list in the bookmark managing system according to the second embodiment of the present information;

FIG. 9 is a diagram showing a list of shared bookmark information list in the bookmark managing system according to the second embodiment of the present invention;

FIG. 10 is a diagram showing an example of an advertisement information list in the bookmark managing system according to the second embodiment of the present invention;

FIG. 11 is a diagram showing an example of a display of a bookmark performed by a function of a browser included in personal computers or a like according to the second embodiment of the present invention;

FIG. 12 is a diagram showing an example of another display of the bookmark performed by a function of a portable wireless terminal included in personal computers or a like according to the second embodiment of the present invention;

DETAILED DESCRIPTION OF THE PREFERRED EMBODIMENTS

Figures 3, 4:
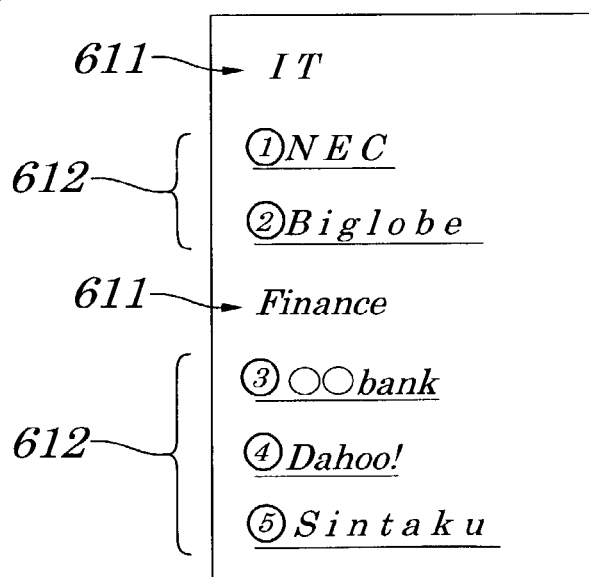
FIG. 3 is a diagram showing an example of another display of the bookmark performed by another browser function incorporated in a portable cellular phone employed in the bookmark managing system according to the first embodiment of the present invention.
FIG. 4 is a diagram showing an example of a bookmark information list employed in the bookmark managing system according to the first embodiment of the present invention.
Figures 13, 14:
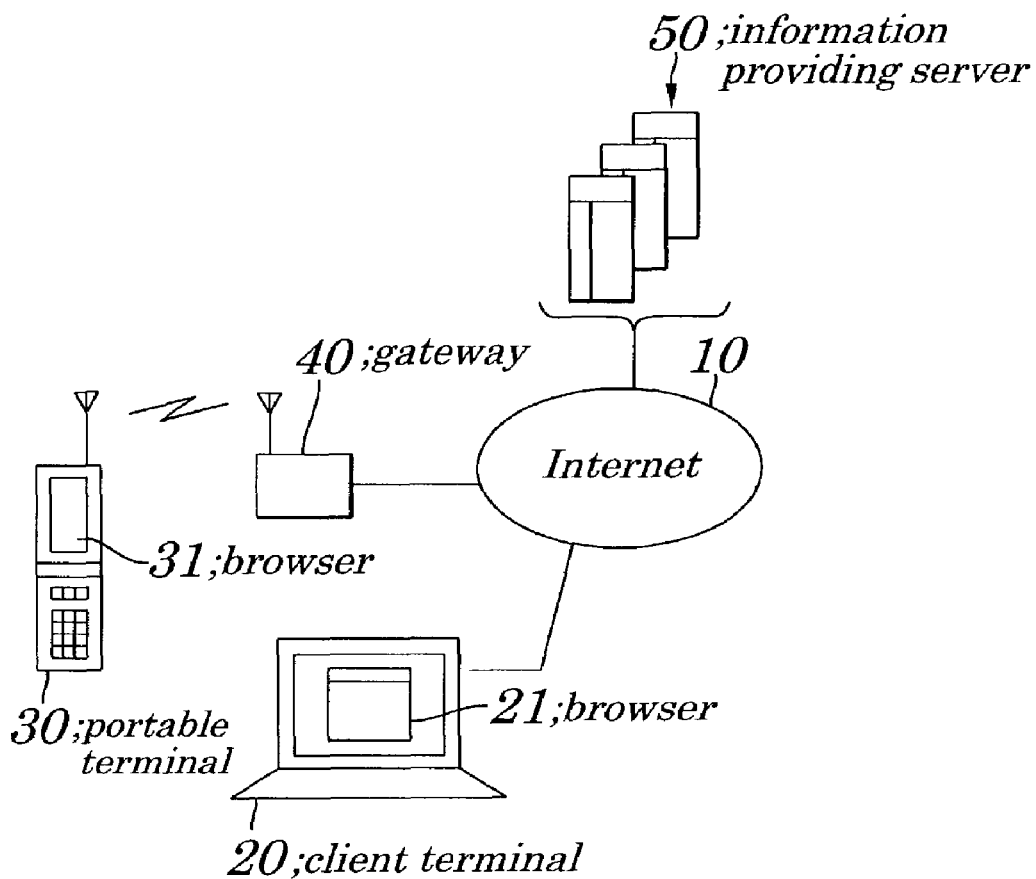
FIG. 13 is a diagram showing configurations of a conventional bookmark managing system.
FIG. 14 is a diagram for showing an example of bookmark information in the conventional bookmark managing system.

Best modes of carrying out the present invention will be described in further detail using various embodiments with reference to the accompanying drawings. Moreover, in descriptions below, a term "bookmark information" represents information being stored by a bookmark function, which includes one and more URLs frequently used by a user.

First Embodiment

Configurations of a bookmark managing system and a bookmark managing method of the first embodiment are described by referring to FIGS. 1 to 5. FIG. 1 is a schematic block diagram showing configurations of the bookmark managing system according to the first embodiment of the present invention.

The bookmark managing system of the first embodiment, as shown in FIG. 1, includes a client terminal 20 and a portable terminal 30 both being used by a user, an Internet 10 adapted to connect the client terminal 20 and the portable terminal 30 to an information providing server 50, and a bookmark managing server 60. The portable terminal 30 is connected to the Internet 10 through a gateway 40. The client terminal 20 internally has a browser 21 while the portable terminal 30 internally has a browser 31. The bookmark managing server 60 has a bookmark information list 61 obtained by collecting bookmark information.

Next, configurations of each component of the bookmark managing system of the first embodiment will be described by referring to FIG. 1. The client terminal 20 is a personal computer or a like which incorporates the browser 21 having a function of displaying WWW (World Wide Web) contents or a like and is connected to the Internet 10. The browser 21, when a user has input an address such as a URL or a like from the client terminal 20, obtains desired WWW contents through the Internet 10 from the information providing service 50 and displays it.

The portable terminal 30 is a portable cellular phone or a like which includes the browser 31 having a function of displaying WWW contents or the like and is connected to the Internet 10 through the gateway 40. The browser 31, when the user has input an address such as the URL or a like through the portable terminal 30, as in the case of the browser 21, obtains desired WWW contents through the Internet 10 from the information providing server 50 and displays it.

The bookmark managing server 60 holds bookmark information of each user, which has the bookmark information list 61 obtained by collecting bookmark information, when having received a bookmark acquisition request through the Internet 10 from browsers 21 and 31 possessed by the client terminal 20 or by the portable terminal 30, obtains bookmark information from the bookmark information List 61 and transmits display data used to display bookmark information to the browsers 21 and 31 which have requested the acquisition of the bookmark. Display data is described in, for example, HTML (Hyper Text Markup Language). The browsers 21 and 31 having received display data, in accordance with the received display data, displays bookmark information on a display section of the client terminal 20 or portable terminal 30.

The information providing server 50 is used to provide various information to the user and, for example, gives contents corresponding to an address such as a URL input by the user from its client terminal 20 or the portable terminal 30 through the Internet 10, to the client terminal 20 or the portable terminal 30.

Next, the bookmark information list 61 will be described by referring to FIG. 2. FIG. 2 is a diagram showing one example of the bookmark information list 61 employed in the bookmark managing system of the first embodiment of the present invention. As shown in FIG. 2, the bookmark information list 61 is a collection of the bookmark information. Each piece of the bookmark information includes name information 612 indicating contents given by a URL and at least two pieces of first URL information (URL1) 613 and second URL information (URL2) 614. Moreover, the bookmark information list 61 includes type information 611 used to manage each bookmark by an arbitrary type, comment information 615 used to store information about each of the bookmarks, and disclosure information 616 indicating whether or not the bookmark information may be made open to a third party other than the user. The bookmark information is managed by each user. When the user makes a request for acquisition of the bookmark, user authentication can be performed, based on the bookmark information, by using a user ID/password method, or an electronic certificate method, or by using a cookie. The disclosure information 616 is used to determine whether or not bookmark information may be disclosed for each bookmark information, when any third party other than an authorized user makes a request for acquisition of the bookmark. URL information is made up of at least two pieces of URL information which includes first URL information (URL1) 613 and second URL information (URL2) 614. The first URL information (URL1) 613 is contained in the browser 21 of the client terminal 20 and the second URL information (URL2) 614 is contained in the browser 31 of the portable terminal 30.

The URL information made up of at least two pieces of URL information including the first URL information (URL1) 613 and the second URL information (URL2) 614 can save a plurality of pieces of specified bookmark information. For example, in the client terminal 20 being a computer or a like being provided with the browser 21 having sufficient processing and displaying capabilities, a URL used to indicate contents described in a general HTML can be stored in the first URL information (URL1) 613 and, in the portable terminal 30 being provided with the browser 31 having limited processing and displaying capabilities, a URL used to indicate contents described in a Compact HTML or the WML (Wireless Markup Language) can be stored in the second URL information (URL2) 614.

The bookmark managing server 60, when receiving a bookmark acquisition request from the browser 21 of the client terminal 20 or from the browser 31 of the portable terminal 30, selects either of the first URL information (URL1) 613 or the second UPI information (URL2) 614 according to a capability of the browser 21 or 31 and then transmits display data required for displaying the bookmark information to the browser 21 or 31 that has made the request for the acquisition of a bookmark.

Next, examples of display by a browser function employed in the first embodiment of the present invention will be explained by referring to FIGS. 3 and 4. FIGS. 3 and 4 are diagrams showing examples of display performed by a browser function incorporated in the portable cellular phone employed in the bookmark managing system of the first embodiment of the present invention. FIG. 3 is the example of display performed in the client terminal 20. FIG. 4 is the example of display performed in the portable terminal 30. In FIG. 3, examples of display of the bookmark information, which is given in the bookmark information list 61, performed by the browser 21 of the client terminal 20 such as the personal computer or the like are provided. In the example, on its left side is provided the type information 611 contained in the bookmark information list 61, in its center is provided the name information 612 and, on its right side is provided the comment information 615. As the type information 611, terms IT and Finance are displayed. As the name information 612, terms NEC and Biglobe are displayed. As the comment information 615, terms Recommended and My Favorite or a like are displayed. Each of the above information is obtained from the bookmark information list 61. The type information 611, name information 612, and comment information 615 shown in FIG. 3 correspond respectively to the type information 611, name information 612, and comment information 615 contained in the bookmark information list 61 shown in FIG. 2.

The name information 612 being underlined in FIG. 3 represents a name display that can be hyperlinked and the first URL information (URL1) 613 is described as information to be hyperlinked by the name underlined display. For example, when a user selects NEC as the name information 612, the browser 21 obtains contents described in a normal HTML represented by a URL term "http:", followed by "//nec.co.jp/" from the information providing server 50 and displays them.

FIG. 4 shows an example of display of bookmark information contained in the bookmark information list 61 and provided by the browser 31 of the portable terminal 30. The browser 31 employed in the example has a limited processing and displaying capability. All pieces of the information including the type information 611, name information 612, or a like are displayed in a single column as shown in FIG. 4. On a top of the display is provided IT as the type information 611 and NEC and Biglobe are subsequently provided as the name information 612 and then Finance as the type information 611, OO bank, Dahoo !, and Sintaku as the name information 612. Thereafter, other type information 611 and name information 612 are sequentially displayed. Each piece of the information is obtained from the bookmark information list 61 as in the case shown in FIG. 3. That is, the type information 611 and the name information 612 respectively correspond to the type information 611 and name information 612 contained in the bookmark information list 61.

Here, the name information 612 being underlined represents a name display that can be hyperlinked and, unlike in the case shown in FIG. 3, the second URL information (URL2) 614 shown in FIG. 2 is described as information to be hyperlinked by the above name underlined display. For example, when a user selects NEC as the name information 612, the browser 31 obtains, from the information providing server 50, contents described in a language represented by "http:", followed by "www.", followed by "nec.jp/i/", for example, in a Compact HTML being different from an ordinary HTML and displays it. That is, in the case shown in FIG. 3, though the first URL information (URL1) 613 represented by "http:", followed by "www.", followed by "nec.co.jp/" is used, however, in the case shown in FIG. 4, the second URL information (URL2) 614 represented by "http:" followed by "www.", followed by "nec.co.jp/i/" is used.

Next, a screen for renewing the bookmark information list 61 described above will be explained by referring to FIG. 5. FIG. 5 is a diagram showing a screen for renewing the bookmark information list 61 employed in the bookmark managing system of the first embodiment of the present invention. On the screen for renewing in the embodiment are provided, as shown in FIG. 5, a column for a name of a type and a column for an addition of a bookmark which enable the bookmark managing to have an editing function of adding, deleting, and changing the bookmark information list 61. In the renewed screen of the embodiment, the editing function in the bookmark information list 61 is provided in a form of the HTML.

Each of columns of the screens for renewing will be described by referring to FIG. 5 below.

In the column for a name of type, a type is provided to which information being currently edited belongs. This column is achieved by using a list box and, by selecting one type from a list contained in the list box, switching can be made so that bookmark information belonging to other type information is edited.

In the column for a present bookmark, a list of a bookmark being stored in the bookmark information list 61 is displayed in a table format. By selecting a check box displayed in a deletion column in the table, the bookmark can be deleted. Moreover, by selecting an arrow displayed in an order column in the table, a display order can be changed up and down.

The column for the addition of a bookmark is used to newly add bookmark information, in which columns for a name of a new bookmark, first URL information (URL1) 613, second URL information (URL2) 614, comment 615, disclosure 616, or a like are provided.

In a lower portion of the screen, a button for transmittance and a button for cancellation are provided. When the transmittance button is selected, contents occurred by being changed on the browser are reflected on the bookmark information list 61. When the cancellation button is selected, contents occurred by being changed on the browser are discarded.

Second Embodiment

A bookmark managing system of a second embodiment will be described by referring to FIG. 6 to FIG. 10. FIG. 6 is a schematic block diagram showing configurations of the bookmark managing system according to a second embodiment of the present invention.

The bookmark managing system of the second embodiment, as in the case of the first embodiment, includes a client terminal 20, a portable terminal 30 both being used by a user, an information providing server 50 to provide information to the user, an Internet 10 to connect the client terminal 20 and portable terminal 30 to the information providing server 50, and a bookmark managing server 60. The client terminal 20 internally has a browser 21 and the portable terminal 30 internally has a browser 31. Moreover, the bookmark managing server 60 has a bookmark information list 61 obtained by collecting bookmark information. The client terminal 20 is a personal computer or a like which internally has the browser 21 having a function of displaying WWW (World Wide Web) contents or a like and is connected to the Internet 10. When the user inputs an address such as a URL or a like from the client terminal 20, the browser 21 obtains desired WWW contents through the Internet 10 from the information providing server 50 and displays it on a display section of the client terminal 20.

The bookmark managing system of the second embodiment is provided with an advertisement providing server 70 to be connected to the Internet 10. Moreover, the bookmark providing server 60, in addition to the bookmark information list 61, includes a user tendency information list 62, a use tendency keyword list 63, a shared bookmark information list 64, and an advertisement information list 65.

Next, configurations of the user tendency information list 62, the use tendency keyword list 63, the shared bookmark information list 64, and the advertisement information list 65 all being provided on the bookmark managing server 60 will be explained by referring to FIG. 7 to FIG. 10.

First, FIG. 7 shows one example of the user tendency information list 62. The bookmark managing server 60 has a function of obtaining user tendency information used to create a user tendency information list 62 from the bookmark information list 61 of each user. The user tendency information list 62 is used to store information about a use tendency of the user as to what kinds of contents the user registers as the bookmark information or what degree the user makes an access to the contents registered as the bookmark information. The user tendency information list 62 of the embodiment shows a result of use tendency of the user, that is, it shows that a number of contents about information industries registered as bookmark information is two (shown for an example) and that a number of times of using the contents registered as the bookmark information is 654 (as an example). It also shows, for example, that a number of contents about finance and investment registered as bookmark information is three and a number of times of using the contents registered as the bookmark information is 413. In FIG. 7, contents about automobiles, music, or a like further follow the above two kinds of the contents.

Next, FIG. 8 shows one example of the use tendency keyword list 63. To create the user tendency information list 62 by using the bookmark information list 61, a use tendency keyword list 63 is used. The use tendency keyword list 63 is used to show correspondence between keywords and contents, that is, the correspondence shows what kind of a field is indicated by a content designated by a keyword. The use tendency keyword list 63 of the embodiment shows that, if keywords such as "www.", followed by "nec.co.jp", NEC, or a like are contained in the bookmark information list 61, the bookmark information are contents corresponding to information industry. Thus, contents in the bookmark information list 61 are compared with keywords contained in the use tendency keyword list 63. As a result, a number of times of appearance of the keyword by category is reflected as a number of registration by category in the user tendency information list 62.

Next, FIG. 9 shows an example of the shared bookmark information list 64. The user tendency information list 62 obtained by the way described above can provide information as to what kind of information the user has as an interest in and/or as to what kind of information the user wants to obtain. The bookmark managing server 60, by using the information providing characteristic of the user tendency information list 62, has a function of providing a shared bookmark so that information that can meet a use tendency or needs of the user is suitably provided and of distributing advertisement information. The function of providing a shared bookmark can be expressed by using the shared bookmark list 64 included in the bookmark managing server 60. The shared bookmark information list 64 is created by abstracting bookmark information from the bookmark information list 61 of users having user tendency information being comparatively similar among themselves, using the user tendency information list 62 of each user. In the shared bookmark information list 64 of the embodiment, category information, names corresponding to the category, URLs for contents, or a like are provided. The shared bookmark information list 64, when bookmark information is transmitted from the bookmark managing server 60, provides a bookmark of a corresponding category in the shared bookmark information list 64, based on a number of registered contents, a number of contents referred to, or a like in the user tendency information list 62 of the user.

Next, FIG. 10 shows an example of the advertisement information list 65. The function of distributing an advertisement is achieved by the advertisement information list 65 included in the bookmark managing server 60. The advertisement information list 65 of the embodiment has information about a category, about a content of an advertisement corresponding to the category information, about a URL of a content provided by the advertisement providing server 70, about a sentence for an advertisement, or a like. Also, the advertisement information list 65 of the embodiment, when bookmark information is transmitted by the bookmark managing server 60, provides an advertisement corresponding to a category in the advertisement information list 65 based on the number of contents registered, number of contents referred to, or a like contained in the user tendency information list 62.

Next, examples of display by a browser function of the second embodiment will be explained by referring to FIGS. 11 and 12. FIGS. 11 and 12 are diagrams showing examples of a display of bookmarks performed by functions of browsers 21, 31 according to the second embodiment of the present invention. FIG. 11 is an example of display by the browser 21, 31 of the client terminal 20 and FIG. 12 is an example of display by the browser of the portable terminal 30. Examples of display in the bookmark shown in FIGS. 11 and 12 include display of shared bookmark information and advertisement information to be provided by functions of providing a shared bookmark and of distributing an advertisement.

First, in the example of display performed by the browser 21 of the client terminal 20 shown in FIG. 11, bookmark information of the user is provided and, in a lower portion of a browser screen is displayed a word "Recommended" or a like as shared bookmark information and in a right portion of the browser screen is displayed a word "Gondo Commercial Company" or a like as advertisement information.

Next, in the example of display performed by the browser 31 of the portable terminal 30 such as portable cellular phones or a like shown in FIG. 12, bookmark information of the user is provided and, in an upper portion of a browser screen is displayed the word "Gondo Commercial Company" or a like as advertisement information and in a lowest portion of the browser screen is displayed the word "Recommendation" or a like as shared bookmark information.

It is apparent that the present invention is not limited to the above embodiments but may be changed and modified without departing from the scope and spirit of the invention. For example, in the above embodiments, the browser 21, 31 obtains desired WWW contents from the information providing server 50 through the Internet 10 by URLs input by the user from the client terminal 20 or portable terminal 30, however, address expression other than URLs may be used.

Also, in the above embodiment, a client terminal 20 such as personal computers or portable terminal 30 such as portable telephones or a like are used, however, all computers accessible to the Internet and all mobile terminals may be employed.

Also, in the above embodiment, the bookmark information list 61 has information about type, name, first URL information (URL1), second URL information (URL2), Comment, and disclosure, however, the present invention is not limited to these and it may have all other effective information.

Moreover, in the above embodiment, the advertisement providing server 70 is provided, however, a server being able to provide various "guidance" including "guidance on a road", "guidance on a place of meeting", "guidance on an emergency hospital", or a like.

Also, as a modification of the above embodiments, either first URL information (URL1) or second URL information (URL2) may be used, instead of using both of first URL information (URL1) and second URL information (URL2). Also, three and more URL information may be used.

Furthermore, in the above embodiment, the bookmark managing server 60 is provided with the bookmark information list 61, user tendency information list 62, use tendency keyword list 63, shared bookmark information list 64, and advertisement information list 65, however, the present invention is not limited to these and other various lists may be provided so long as they are effective.

What is claimed is:

1. A bookmark managing system, comprising:
  a first user terminal having a first processing and displaying capability and a first World Wide Web (WWW) browser;
  a second user terminal having a second processing and displaying capability different from that of said first user terminal and a second WWW browser;
  a server connected to said first and second user terminals through a WWW network and that provides all of a same desired content to said first user terminal and a part that is less than all of the same desired content to said second user terminal; and a bookmark managing server connected to said first and second user terminals through the network, said bookmark managing server storing two different Uniform Resource Locator (URL) bookmark addresses for the all and the part of the same desired content under a common bookmark that is available to both said first and second user terminals through the network, a first one of said two URL bookmark addresses providing the all of the same desired content so as to be suitable for displaying at said first user terminal but not suitable for displaying at said second user terminal, and a second one of said two URL bookmark addresses providing the part of the same desired content so as to be suitable for displaying at said second user terminal, wherein said first one of said two URL bookmark addresses is in hyper text markup language and said second one of said two URL bookmark addresses is in wireless markup language.

2. The system of claim 1, wherein said bookmark managing server also stores, under the common bookmark for the same desired content, an editorial comment about the same desired content.

3. The system of claim 1, wherein said second user terminal is a portable terminal having a lesser processing and displaying capability than said first user terminal.

4. The system of claim 1, wherein said bookmark managing server also stores, under the common bookmark for the same desired content, an indication whether the common bookmark for the same desired content is to be made available to a third user terminal different from said first and second user terminals.

5. A bookmark managing method, comprising the steps of:

providing a first user terminal having a first processing and displaying capability and a first World Wide Web (WWW) browser and a second user terminal having a second processing and displaying capability different from that of the first user terminal and a second WWW browser;

connecting the first and second user terminals to a server through a WWW network, the server providing all of a same desired content to the first user terminal and a part that is less than all of the same desired content to said second user terminal upon request; and storing in a bookmark managing server two different Uniform Resource Locator (URL) bookmark addresses for the all and the part of the same desired content under a common bookmark that is available to both the first and second user terminals through the network, the bookmark managing server being connected to the first and second user terminals through the network, a first one of the two URL bookmark addresses providing the all of the same desired content so as to be suitable for displaying at the first user terminal but not suitable for displaying at the second user terminal, and a second one of the two URL bookmark addresses providing the part of the same desired content so as to be suitable for displaying at the second user terminal, wherein the first one of said two URL bookmark addresses is in hyper text markup language and said second one of said two URL bookmark addresses is in wireless markup language.

6. The method of claim 5, wherein the bookmark managing server also stores, under the common bookmark for the desired content, an editorial comment about the desired content.

7. The method of claim 5, wherein the second user terminal is a portable terminal having a lesser processing and displaying capability than the first user terminal.

8. The method of claim 5, wherein the bookmark managing server also stores, under the common bookmark for the same desired content, an indication whether the common bookmark for the same desired content is to be made available to a third user terminal different from the first and second user terminals.

9. A bookmark managing system, comprising:

a first user terminal having a first processing and displaying capability and a first World Wide Web (WWW) browser;

a second user terminal having a second processing and displaying capability different from that of said first user terminal and a second WWW browser;

a server connected to said first and second user terminals through a WWW network and that provides all of a same desired content to said first user terminal and a part that is less than all of the same desired content to said second user terminal; and a bookmark managing server connected to said first and second user terminals through the network, said bookmark managing server storing two different Uniform Resource Locator (URL) bookmark addresses for the all and the part of the same desired content under a common bookmark that is available to both said first and second user terminals through the network, a first one of said two URL bookmark addresses providing the all of the same desired content so as to be suitable for displaying at said first user terminal but not suitable for displaying at said second user terminal, and a second one of said two URL bookmark addresses providing the part of the same desired content so as to be suitable for displaying at said second user terminal, wherein said bookmark managing server, when receiving a bookmark acquisition request from one of said first and second user terminals, selects one of said two URL bookmark addresses based on the processing and displaying capability of the requesting one of said first and second user terminals.

10. A bookmark managing method, comprising the steps of:

providing a first user terminal having a first processing and displaying capability and a first World Wide Web (WWW) browser and a second user terminal having a second processing and displaying capability different from that of the first user terminal and a second WWW browser;

connecting the first and second user terminals to a server through a WWW network, the server providing all of a same desired content to the first user terminal and a part that is less than all of the same desired content to said second user terminal upon request; and storing in a bookmark managing server two different Uniform Resource Locator (URL) bookmark addresses for the all and the part of the same desired content under a common bookmark that is available to both the first and second user terminals through the network, the bookmark managing server being connected to the first and second user terminals through the network, a first one of the two URL bookmark addresses providing the all of the same desired content so as to be suitable for displaying at the first user terminal but not suitable for displaying at the second user terminal, and a second one of the two URL bookmark addresses providing the part of the same desired content so as to be suitable for displaying at the second user terminal, wherein said bookmark managing server, when receiving a bookmark acquisition request from one of said first and second user terminals, selects one of said two URL bookmark addresses based on the processing and displaying capability of the requesting one of said first and second user terminals.

* * * * *